(12) United States Patent
Brunn et al.

(10) Patent No.: US 8,681,893 B1
(45) Date of Patent: Mar. 25, 2014

(54) GENERATING PULSES USING A LOOK-UP TABLE

(75) Inventors: Brian Brunn, Austin, TX (US); Marc Leroux, Austin, TX (US)

(73) Assignee: Marvell International Ltd., Hamilton (BM)

( * ) Notice: Subject to any disclaimer, the term of this patent is extended or adjusted under 35 U.S.C. 154(b) by 591 days.

(21) Appl. No.: 12/574,879

(22) Filed: Oct. 7, 2009

Related U.S. Application Data

(60) Provisional application No. 61/103,737, filed on Oct. 8, 2008.

(51) Int. Cl.
 *H04L 27/00* (2006.01)

(52) U.S. Cl.
 USPC .......................................................... 375/295

(58) Field of Classification Search
 USPC ................... 375/295, 286, 355, 296
 See application file for complete search history.

(56) References Cited

U.S. PATENT DOCUMENTS

| | | | |
|---|---|---|---|
| 4,449,190 A | 5/1984 | Flanagan et al. | |
| 5,134,633 A * | 7/1992 | Werner | 375/260 |
| 5,245,704 A | 9/1993 | Weber et al. | |
| 5,623,474 A | 4/1997 | Oshio et al. | |
| 5,650,860 A | 7/1997 | Uz | |
| 5,778,029 A * | 7/1998 | Kaufmann | 375/296 |
| 5,930,299 A * | 7/1999 | Vannatta et al. | 375/269 |
| 6,031,628 A * | 2/2000 | Jacob et al. | 358/1.9 |
| 6,255,906 B1 | 7/2001 | Eidson et al. | |
| 6,266,517 B1 * | 7/2001 | Fitzpatrick et al. | 455/114.3 |
| 6,275,685 B1 | 8/2001 | Wessel et al. | |
| 6,639,944 B1 | 10/2003 | De Haan et al. | |
| 6,667,659 B2 * | 12/2003 | Stengel et al. | 330/286 |
| 6,731,406 B1 * | 5/2004 | Ganapathy et al. | 358/3.1 |
| 6,912,249 B2 | 6/2005 | Haartsen | |
| 6,950,469 B2 | 9/2005 | Karczewicz et al. | |
| 6,983,026 B2 | 1/2006 | Pinckley et al. | |
| 7,023,941 B1 * | 4/2006 | Rey et al. | 375/355 |
| 7,218,786 B2 | 5/2007 | Lin | |
| 7,262,722 B1 | 8/2007 | Jahanghir et al. | |
| 7,362,818 B1 | 4/2008 | Smith et al. | |
| 7,418,057 B2 | 8/2008 | Shako et al. | |
| 7,447,274 B2 | 11/2008 | Shako et al. | |
| 7,450,641 B2 | 11/2008 | Sun et al. | |
| 7,466,762 B2 | 12/2008 | Shako et al. | |
| 7,599,431 B1 | 10/2009 | Anderson et al. | |
| 7,675,886 B2 | 3/2010 | Agrawal et al. | |
| 7,684,627 B2 | 3/2010 | Ranganathan | |
| 7,702,020 B2 | 4/2010 | Gallant et al. | |
| 7,706,475 B1 | 4/2010 | Kopikare et al. | |
| 7,782,973 B2 | 8/2010 | Kim et al. | |
| 7,822,147 B2 | 10/2010 | Huang et al. | |
| 7,969,964 B2 | 6/2011 | Kim et al. | |

(Continued)

OTHER PUBLICATIONS

"Non-Final Office Action", U.S. Appl. No. 12/269,744, (Aug. 18, 2011), 10 pages.

(Continued)

*Primary Examiner* — Jaison Joseph

(57) ABSTRACT

This disclosure describes techniques for using a pulse look-up-table to replace FIR filters used to implement modulation schemes, such as the modulation schemes used by various wireless communication technologies. In some embodiments the pulse look-up-table is segmented and minimized so that the pulse look-up-table can be used with complex modulation schemes.

22 Claims, 6 Drawing Sheets

(56) References Cited

U.S. PATENT DOCUMENTS

| | | | |
|---|---|---|---|
| 7,991,063 | B2 | 8/2011 | Khan et al. |
| 8,014,737 | B2 | 9/2011 | Pratt et al. |
| 8,059,588 | B2 | 11/2011 | Sood |
| 8,059,630 | B2 | 11/2011 | Prateek |
| 8,160,150 | B2 | 4/2012 | Moore |
| 8,498,342 | B1 | 7/2013 | Sha et al. |
| 8,520,771 | B1 | 8/2013 | Brunn et al. |
| 8,542,725 | B1 | 9/2013 | Qian et al. |
| 8,565,325 | B1 | 10/2013 | Banerjea |
| 2002/0067773 | A1* | 6/2002 | Jackson et al. .......... 375/308 |
| 2002/0072346 | A1* | 6/2002 | Kato et al. ............... 455/403 |
| 2003/0164736 | A1* | 9/2003 | Stengel et al. .......... 330/286 |
| 2003/0179831 | A1 | 9/2003 | Gupta et al. |
| 2004/0090909 | A1 | 5/2004 | Khlat |
| 2004/0232984 | A1 | 11/2004 | Meade et al. |
| 2005/0018519 | A1* | 1/2005 | Nii ............................. 365/227 |
| 2005/0213661 | A1 | 9/2005 | Xiang et al. |
| 2005/0231292 | A1* | 10/2005 | Akahori et al. .......... 331/16 |
| 2005/0243946 | A1 | 11/2005 | Chung et al. |
| 2006/0126962 | A1 | 6/2006 | Sun |
| 2006/0174236 | A1 | 8/2006 | Stein et al. |
| 2006/0227895 | A1 | 10/2006 | Booth et al. |
| 2007/0025448 | A1 | 2/2007 | Cha et al. |
| 2007/0086528 | A1 | 4/2007 | Mauchly et al. |
| 2007/0118791 | A1* | 5/2007 | Hepler et al. ........... 714/786 |
| 2007/0135065 | A1 | 6/2007 | Leffel et al. |
| 2007/0241812 | A1 | 10/2007 | Yang et al. |
| 2008/0031376 | A1 | 2/2008 | Ban |
| 2008/0040411 | A1 | 2/2008 | Stojancic et al. |
| 2008/0043702 | A1 | 2/2008 | Moon et al. |
| 2008/0049709 | A1 | 2/2008 | Pan et al. |
| 2008/0074289 | A1 | 3/2008 | Sauder et al. |
| 2008/0089282 | A1 | 4/2008 | Malladi et al. |
| 2008/0094280 | A1* | 4/2008 | Fenton .................... 342/357.12 |
| 2008/0123515 | A1* | 5/2008 | Boehlke et al. ........ 370/206 |
| 2008/0219373 | A1 | 9/2008 | Zhang et al. |
| 2008/0247467 | A1 | 10/2008 | Rusanovskyy et al. |
| 2008/0270344 | A1* | 10/2008 | Yurick et al. ............ 707/2 |
| 2009/0086820 | A1 | 4/2009 | Hong et al. |
| 2009/0097533 | A1 | 4/2009 | Lakkis |
| 2009/0103622 | A1 | 4/2009 | Tripathi et al. |
| 2009/0181622 | A1 | 7/2009 | Hardacker |
| 2009/0213946 | A1 | 8/2009 | Dick et al. |
| 2009/0257526 | A1 | 10/2009 | Wang et al. |
| 2009/0310704 | A1 | 12/2009 | Jethanandani et al. |
| 2010/0035554 | A1 | 2/2010 | Ba et al. |
| 2010/0135257 | A1 | 6/2010 | Higuchi et al. |
| 2010/0239034 | A1 | 9/2010 | Lee et al. |
| 2011/0007717 | A1 | 1/2011 | Swarts et al. |
| 2011/0007718 | A1 | 1/2011 | Swarts et al. |
| 2011/0013730 | A1 | 1/2011 | Mansson et al. |
| 2013/0021976 | A1 | 1/2013 | Yang et al. |

OTHER PUBLICATIONS

"Restriction Requirement", U.S. Appl. No. 12/269,744, (Jun. 22, 2011), 6 pages.

Mujtaba, Syed A., "TGn Sync Proposal Technical Specification", *IEEE 802.11-04 / Wireless LANs*, (May 2005), pp. 1-131.

Zhang, Hongyuan et al., "U.S. Appl. No. 12/098,222", (Apr. 4, 2008), 78 pages.

"Non-Final Office Action", U.S. Appl. No. 12/397,057, (Nov. 9, 2011), 7 pages.

"Non-Final Office Action", U.S. Appl. No. 12/510,716, (Nov. 8, 2011), 8 pages.

"Non-Final Office Action", U.S. Appl. No. 12/511,606, (Jan. 4, 2012), 6 pages.

"Final Office Action", U.S. Appl. No. 12/397,057, (Apr. 27, 2012), 11 pages.

"Non-Final Office Action", U.S. Appl. No. 12/269,744, (Feb. 16, 2012), 14 pages.

"Non-Final Office Action", U.S. Appl. No. 12/511,629, (Apr. 13, 2012), 6 pages.

"Final Office Action", U.S. Appl. No. 12/510,716, (Jun. 28, 2012), 10 pages.

"Non-Final Office Action", U.S. Appl. No. 12/253,078, (Jun. 8, 2012), 18 pages.

"Non-Final Office Action", U.S. Appl. No. 12/397,057, (Aug. 1, 2012), 10 pages.

"Final Office Action", U.S. Appl. No. 12/269,744, Sep. 19, 2012, 13 pages.

"Final Office Action", U.S. Appl. No. 12/511,606, Sep. 13, 2012, 8 pages.

"Non-Final Office Action", U.S. Appl. No. 12/767,922, Nov. 2, 2012, 12 pages.

"Final Office Action", U.S. Appl. No. 12/397,057, Feb. 1, 2013, 13 pages.

"Final Office Action", U.S. Appl. No. 12/253,078, Feb. 13, 2013, 21 pages.

"Final Office Action", U.S. Appl. No. 12/511,629, Dec. 7, 2012, 7 pages.

"Non-Final Office Action", U.S. Appl. No. 13/182,004, May 21, 2013, 9 pages.

"Notice of Allowance", U.S. Appl. No. 12/269,744, Apr. 10, 2013, 11 pages.

"Notice of Allowance", U.S. Appl. No. 12/767,922, Apr. 16, 2013, 5 pages.

"Notice of Allowance", U.S. Appl. No. 12/511,629, Mar. 28, 2013, 7 pages.

"Notice of Allowance", U.S. Appl. No. 12/397,057, May 15, 2013, 7 pages.

"Supplemental Notice of Allowance", U.S. Appl. No. 12/269,744, May 20, 2013, 8 pages.

"Supplemental Notice of Allowance", U.S. Appl. No. 12/269,744, Jul. 1, 2013, 8 pages.

"Non-Final Office Action", U.S. Appl. No. 12/510,716, Oct. 23, 2013, 12 pages.

"Non-Final Office Action", U.S. Appl. No. 13/182,004, Oct. 22, 2013, 14 pages.

"Non-Final Office Action", U.S. Appl. No. 12/511,606, Aug. 22, 2013, 8 pages.

"Supplemental Notice of Allowance", U.S. Appl. No. 12/397,057, Aug. 26, 2013, 2 pages.

"Supplemental Notice of Allowance", U.S. Appl. No. 12/269,744, Aug. 23, 2013, 7 pages.

"Non-Final Office Action", U.S. Appl. No. 12/253,078, Nov. 21, 2013, 25 pages.

"Non-Final Office Action", U.S. Appl. No. 13/966,753, Dec. 24, 2013, 8 pages.

\* cited by examiner

GENERATING PULSES USING A LOOK-UP TABLE

RELATED APPLICATION

This application claims priority to U.S. Provisional Patent Application Ser. No. 61/103,737 filed Oct. 8, 2008, the disclosure of which is incorporated by reference herein in its entirety.

BACKGROUND

Many conventional methods of modulating data for transmission utilize phase-shift-keying (PSK). PSK maps data to In-phase Quadrature-phase (IQ) constellation symbols. An IQ constellation symbol is a plot of an In-phase (I) value along a horizontal axis and a Quadrature-phase (Q) value along a vertical axis. I and Q pulses are then generated from the IQ constellation symbols and used to create a transmittable signal.

Generating I and Q pulses, however, often requires complex mathematical processing performed by finite impulse response (FIR) filters. FIR filters use undesirably large amounts of average and peak current power and also generate undesired radio frequency (RF) noise caused by current spikes generated by clocking of registers. FIR filters and accompanying noise-filtering electronics used to filter out the undesired RF noise are often expensive, in part due to the area used by these filters in an electronic circuit.

This Background is provided as an introduction to certain concepts discussed herein. The information in the Background is not intended to describe, and should not be considered as describing, prior art.

SUMMARY

This summary is provided to introduce subject matter that is further described below in the Detailed Description and Drawings. Accordingly, this Summary should not be considered to describe essential features nor used to limit the scope of the claimed subject matter.

In one embodiment, a method is described that comprises generating an In-phase (I) pulse for an In-phase Quadrature-phase (IQ) constellation symbol using a pulse look-up-table; and generating a Quadrature-phase (Q) pulse for the IQ constellation symbol using the pulse look-up-table, wherein the I pulse and the Q pulse are combinable into a transmittable signal.

In another embodiment, a system is described that comprises a pulse look-up-table having pulses for a modulation scheme, the pulse look-up-table divided into two or more segments, the segments accessible simultaneously and a pulse generator configured to simultaneously access the pulse look-up-table to generate pulses for In-phase Quadrature-phase (IQ) constellation symbols.

In still another embodiment, a method is described that comprises mapping a bit of data to an In-phase Quadrature-phase (IQ) constellation symbol, determining a first zero value, a first negation value, and a first angle value for an In-phase (I) value of the IQ constellation symbol, determining a second zero value, a second negation value, and a second angle value for a Quadrature-phase (Q) value of the IQ constellation symbol, generating a first pulse sample for the I value and a second pulse sample for the Q value using a pulse look-up-table and at least one of the first zero value, the first negation value, the first angle value, the second zero value, the second negation value, or the second angle value, the pulse look-up-table minimized and divided into segments, and providing the first and second pulse samples for combination as part of a transmittable signal for communicating the bit of data.

BRIEF DESCRIPTION OF THE DRAWINGS

The detailed description is described with reference to the accompanying figures. In the figures, the left-most digit of a reference number identifies the figure in which the reference number first appears. The use of the same reference numbers in different instances in the description and the figures indicate similar or identical items.

DETAILED DESCRIPTION

Overview

As noted in the Background above, conventional methods of generating pulses from IQ symbols often require complex mathematical processing performed by finite impulse response (FIR) filters. FIR filters use a significant amount of power, generate RF noise, and/or occupy a large area of an electronic circuit. This disclosure describes techniques for using a pulse look-up-table to replace FIR filters used to implement modulation schemes, such as the modulation schemes used by various wireless communication technologies. In some embodiments the pulse look-up-table is segmented and minimized so that the pulse look-up-table can be used with complex modulation schemes. Segmentation allows for a lower clock speed to be used for reading the pulse look-up-table because each segment can be accessed during the same clock cycle. Minimization allows for the pulse look-up-table to use less area of an electronic circuit. Compared to conventional FIR filter techniques, these techniques use less power, generate less RF noise, and/or use less area of an electronic circuit.

In the discussion that follows, an example operating environment is described. An example method is also described that may be employed in the example operating environment as well as other environments. In the discussion below, reference will be made to the environment by way of example only and, therefore, implementations described below are not limited to the example environment.

Example Operating Environment

Figure 1:
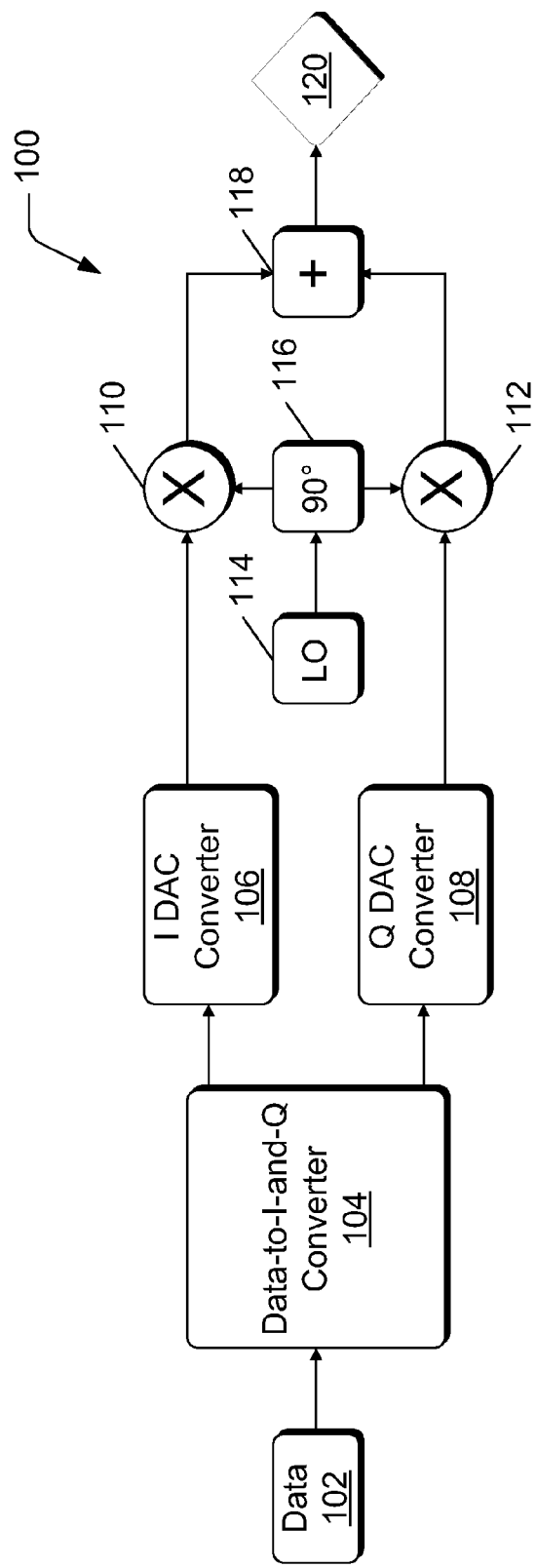
FIG. 1 illustrates an example operating environment configured to convert data into a transmittable signal.

FIG. 1 illustrates an example operating environment 100, which is configured to convert data into a transmittable signal for use in Enhanced Data rates for GSM Evolution (EDGE) wireless communications. Data 102 is input into a data-to-I-and-Q converter 104, which divides the data into blocks of three bits each and generates an I and Q pulse for each block. Data-to-I-and-Q converter 104 is configured to combine this generated I and Q pulse with I and Q pulses of up to four other data blocks to create complete (combined) I and Q signals.

The complete I signal is output to I digital-to-analog (IDAC) converter 106, which converts the complete I signal from digital to analog. Likewise, the complete Q signal is output to Q digital-to-analog (QDAC) converter 108, which converts the complete Q signal from digital to analog.

The resulting analog I and Q signals are output to mixers 110 and 112, respectively. Local oscillator (LO) 114 provides a frequency signal for transmission. Quadrature circuit 116 provides a ninety-degree phase shift. This phase shift causes the frequency signal output to mixer 110 to be ninety degrees out of phase with the frequency signal provided to mixer 112. Mixers 110 and 112 mix the analog I and Q signals with the frequency signals provided by quadrature circuit 116 to create up-converted I and Q signals. The up-converted I and Q signals are output to combiner 118. Combiner 118 combines the up-converted I and Q signals into a transmittable signal 120. Transmittable signal 120 may be transmitted as is or may be further modified (e.g., amplified).

Figure 2:
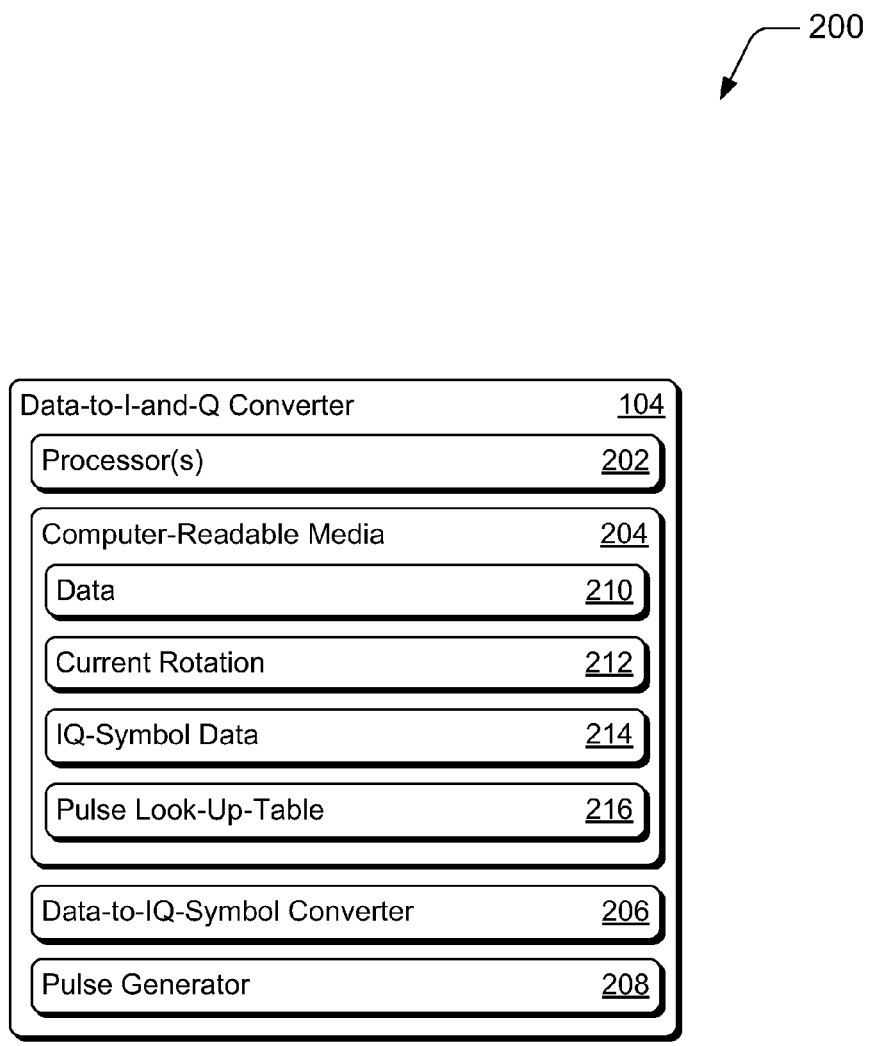
FIG. 2 illustrates a more-detailed example of the data-to-I-and-Q converter of FIG. 1.

FIG. 2 illustrates a more-detailed example of data-to-I-and-Q converter 104. Data-to-I-and-Q converter 104 includes one or more processors 202, one or more computer-readable media 204, data-to-IQ-symbol converter 206, and pulse generator 208. Computer-readable media 204 may include various kinds of media, such as volatile (e.g., Static Random Access Memory, or SRAM) and non-volatile memory (e.g., flash memory, sixty-five nanometer (nm) Read-Only Memory (ROM), solid state disk, spinning-media hard-disk drive, or CD/DVD). Computer-readable media 204 includes data 210, current rotation 212, IQ-symbol data 214, and pulse look-up-table 212.

Data 210 is arranged into bits of data, which data-to-I-and-Q converter 104 receives. Current rotation 212 tracks the current rotation of the modulation scheme, such as the $3\pi/8$ rotated eight-phase-shift-keying (8-PSK) constellation for the EDGE modulation scheme.

Figure 3:
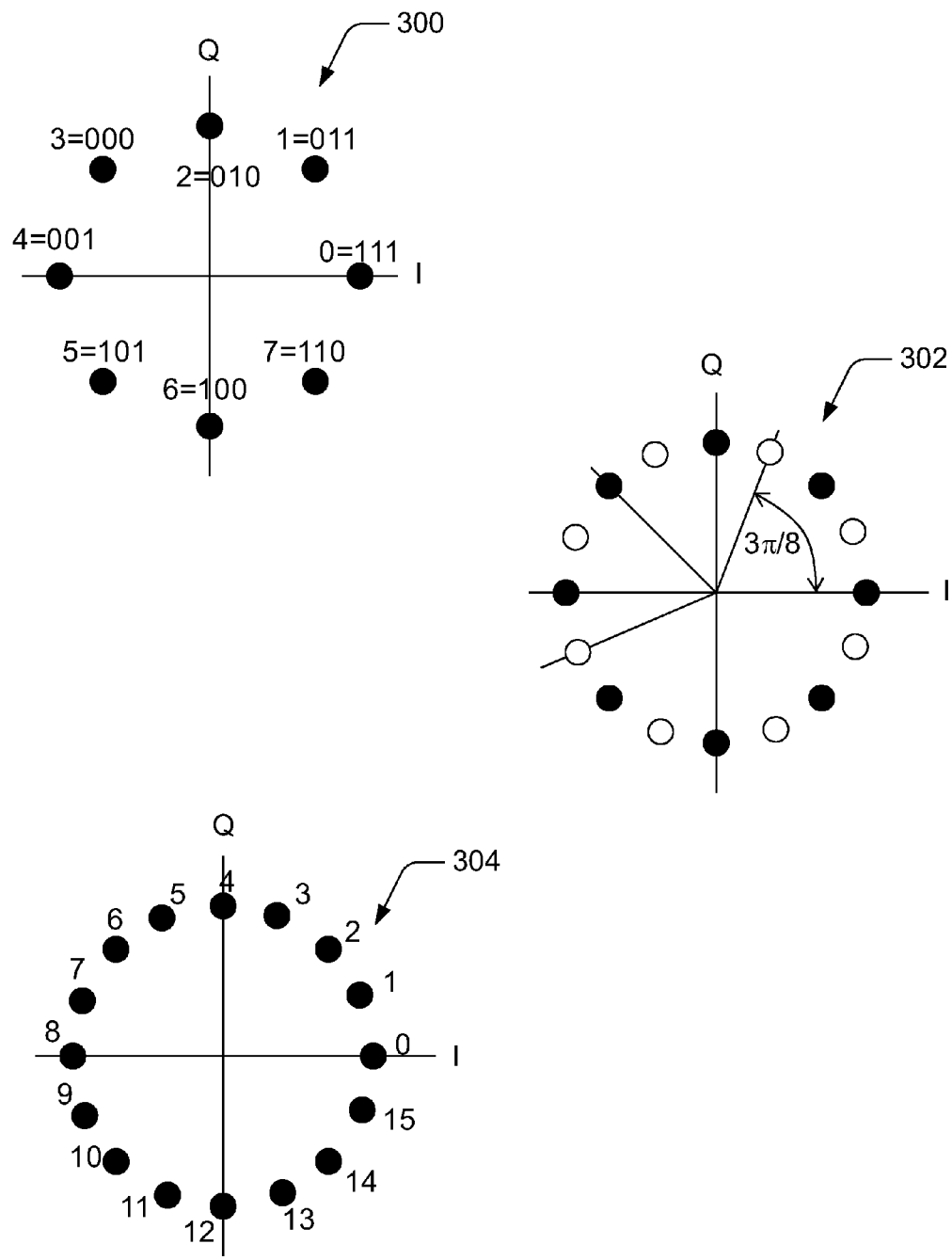
FIG. 3 illustrates three IQ charts for explaining the $3\pi/8$ rotated eight-phase-shift-keying (8-PSK) constellation used by the modulation scheme of Enhanced Data rates for GSM Evolution (EDGE).

For more information on current rotation consider FIG. 3, which illustrates IQ charts 300, 302, and 304. IQ chart 300 shows an 8-PSK constellation with gray coding. Gray coding means that each dot (each an IQ constellation symbol) on the chart has one bit of data difference with either of the dots immediately next to the dot. The numbers associated with the dots show the IQ constellation symbol number and the bits of data assigned to the dots. For example, "0=111" means that the dot is IQ constellation symbol 0 and is used to represent the bits "111."

IQ chart 302 shows a $3\pi/8$ rotation in which the 8-PSK constellation is rotated by $3\pi/8$ (67.5 degrees) after each IQ constellation symbol. Effectively this turns the PSK constellation used by EDGE into a sixteen-PSK (16-PSK) constellation shown in IQ chart 304. For example, for the first mapping of data to an IQ constellation symbol, the bits "111" are represented by IQ constellation symbol 0 on chart 304. For subsequent mappings of data to IQ constellation symbols, the bits "111" are represented by IQ constellation symbols 3, 6, 9, 12, 15, 2, 5, 8, 11, 14, 1, 4, 7, 10, 13, 0, 3, etc. Current rotation 212 (shown in FIG. 2) holds the current rotation in 16-PSK IQ constellation symbol numbers away from symbol 0. Thus, current rotation 212 holds the value three for the first rotated point in IQ chart 302. Current rotation 212 is incremented by three until current rotation 212 is over fifteen, at which point sixteen is subtracted. Current rotation 212 holds the number of the IQ constellation symbol that represents the bits "111" for a given rotation.

Data-to-IQ-symbol converter 206 can receive three-bit blocks of data from data 210 and convert each of the three-bit blocks of data into a particular 16-PSK IQ constellation symbol using the value in current rotation 212. Data-to-IQ-symbol converter 206 can increment current rotation 212 before converting each next block of data into a constellation symbol.

IQ-symbol data 214 includes a zero value, a negation value, and an angle value for each I value and again for each Q value at each IQ constellation symbol (here 0-15 shown in FIG. 3). For example, in the 16-PSK constellation shown in IQ chart 304, each IQ constellation symbol is at an angle of 22.5 degrees away from the next IQ symbol and IQ constellation symbol 0 is at zero degrees. An I value is the cosine of the angle and a Q value is the sine of the angle. An IQ constellation symbol here is a plot of the I value (horizontal axis) and the Q value (vertical axis). Because of the symmetry inherent in the 16-PSK constellation there are five unique angle values, which can be used to replicate the I and Q values of all sixteen IQ constellation symbols. For example, in IQ chart 304 of FIG. 3 IQ constellation symbols 0, 1, and 2 contain all the unique angles necessary to represent all the other IQ constellation symbols. The I value of IQ constellation symbol 8 is the negative of the I value of IQ constellation symbol 0. The Q value of IQ constellation symbol 3 is the I value of IQ constellation symbol 1. Through negation or through mapping between I and Q all the other IQ constellation symbols can be represented using only IQ constellation symbols 0, 1, and 2. Table I, below, illustrates the zero value, negation value, and angle value for I and Q values for each IQ constellation symbol.

TABLE I

| | I values | | | | Q values | | |
|---|---|---|---|---|---|---|---|
| IQ Symbol | Zero | Neg. | Angle | IQ Symbol | Zero | Neg. | Angle |
| 0 | 0 | 0 | 0 | 4 | 0 | 0 | 0 |
| 1 | 0 | 0 | 1 | 5 | 0 | 0 | 1 |
| 2 | 0 | 0 | 2 | 6 | 0 | 0 | 2 |
| 3 | 0 | 0 | 3 | 7 | 0 | 0 | 3 |
| 4 | 1 | X | X | 8 | 1 | X | X |
| 5 | 0 | 1 | 3 | 9 | 0 | 1 | 3 |
| 6 | 0 | 1 | 2 | 10 | 0 | 1 | 2 |
| 7 | 0 | 1 | 1 | 11 | 0 | 1 | 1 |
| 8 | 0 | 1 | 0 | 12 | 0 | 1 | 0 |
| 9 | 0 | 1 | 1 | 13 | 0 | 1 | 1 |
| 10 | 0 | 1 | 2 | 14 | 0 | 1 | 2 |
| 11 | 0 | 1 | 3 | 15 | 0 | 1 | 3 |
| 12 | 1 | X | X | 0 | 1 | X | X |
| 13 | 0 | 0 | 3 | 1 | 0 | 0 | 3 |
| 14 | 0 | 0 | 2 | 2 | 0 | 0 | 2 |
| 15 | 0 | 0 | 1 | 3 | 0 | 0 | 1 |
| −1 | 1 | x | x | −1 | 1 | x | x |

The zero value is a flag value, which indicates that the I or Q value is zero if the zero value is set to one. In this case no negation or angle values are used because the negative of zero is zero and a pulse with a peak of zero has a sample of zero for all pulse samples. The negation value is a flag value, which if set to one indicates that the value is negative (e.g., the IQ symbol is on the negative side of the I or Q axes). The angle value is an index for the angle. An angle value of zero indicates an angle of zero degrees, of one an angle of 22.5 degrees, of two an angle of forty-five degrees, and of three an angle of 67.5 degrees.

The I values (the cosine) of each of the angles are used to pre-create a series of samples that make up Gaussian pulses (explained below). The pulse samples are stored in pulse look-up-table 216. Note that the cosine of 67.5 degrees is the sine of 22.5 degrees (e.g., the I value of symbol 3 is the Q value of symbol 1). The negation value is used to negate the stored pulse samples. As shown in the table above, there are only four unique angles stored and one value of zero. The IQ constellation symbol of "−1" as shown in the table above indicates a point at the origin (not shown) of IQ chart 304 in FIG. 3, which has an I value of zero and a Q value of zero.

Figure 4:
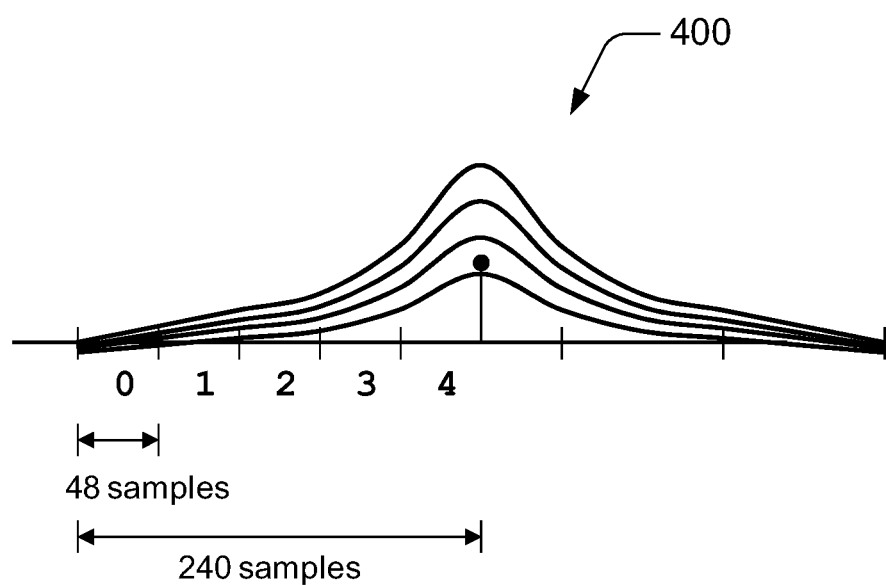
FIG. 4 illustrates five unique pulses broken into segments of forty-eight samples each.

For EDGE wireless communications an I or Q value is represented as a Gaussian pulse. A Gaussian pulse is a pulse that has a waveform described by the Gaussian distribution. In this example a continuous time impulse response is used. The peak of a pulse is determined by the associated I or Q value (cosine of the angle associated with the angle value in the table above), which is distributed along the entire pulse. For example, FIG. 4 illustrates pulse chart 400, which shows five possible pulses (402). Note that the zero value pulse is a repetition of zero for every sample and thus a flat line along the horizontal axis of chart 400. The numbers 0-4 indicate five different sections of the pulses that are stored in different segments of pulse look-up-table 216 of FIG. 2.

Pulse look-up-table 216 contains pulse samples for each sample of the four unique pulses. Pulse look-up-table 216 does not contain the zero value pulse because all the samples have the same value of zero. Since a pulse is symmetrical, one half of a pulse's samples can be stored in pulse look-up-table 216. The other half of the pulse can be generated by navigating pulse look-up-table 216 in reverse order. In this way pulse look-up-table 216 is minimized by exploiting this symmetry. By so doing, pulse look-up-table 216 contains only four pulses and only one half of those pulses. The four pulses comprise a unique set of pulses from which all other pulses for the IQ constellation can be replicated through negation or through mapping between I and Q values.

In more detail, a single pulse may include 480 pulse samples, of which the first 240 pulse samples can be stored within pulse look-up-table 216. For EDGE wireless communications a new IQ constellation symbol is output every ninety-six pulse samples and any overlapping pulse samples are added together to create a complete signal sample.

Figure 5:
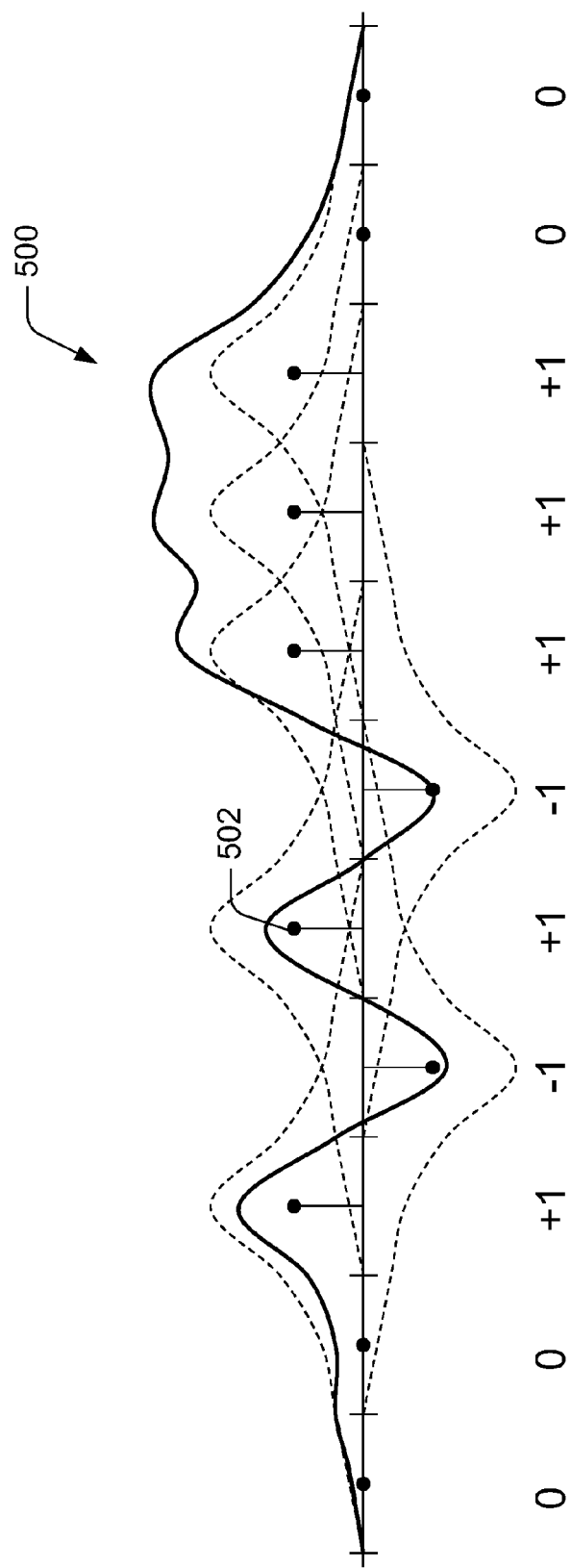
FIG. 5 illustrates multiple time-overlapping pulses and a combined signal.

By way of example consider pulse graph 500 illustrated in FIG. 5. Pulse graph 500 illustrates multiple pulses over time, which pulses are represented by dotted lines. The multiple pulses overlap; a dark line represents a complete signal, which is the result of combining together each of the overlapping pulse samples of the multiple pulses. For example, at point 502 three positive pulse samples and two negative pulse samples are added together to create a complete signal sample. Note that each pulse is peaked at its associated IQ constellation symbol's point of output (represented by the dots in FIG. 5) in time.

The sample rate implemented is twenty-six million samples per second. A sample time is therefore $\frac{1}{26,000,000}$ seconds. The time between outputs of a new IQ constellation symbol (hereinafter symbol period) is ninety-six sample times. Because a single pulse is 480 samples, five IQ constellation symbols overlap (480/96). Because pulse generator 208 is generating pulses for five IQ constellation symbols at the same time and each symbol has an I and Q pulse, ten look-up operations read pulse look-up-table 216 at a given sample time. If these ten look-up operations cannot be performed simultaneously, the clock speed of computer-readable media 204 must be faster than the sample rate (e.g., 26 megahertz×10=260 Mhz for 10 look-up operations). In order to facilitate ten simultaneous look-up operations, pulse look-up table 216 is segmented into ten separate segments. Pulse look-up-table 216 is divided into two separate segments, one for I and one for Q. Each of these segments duplicates the information in the other because the I and Q pulses are identical. Each of the I and Q segments are divided into five equal segments of forty-eight samples each (e.g., 0-4 of FIG. 4). By dividing pulse look-up-table 216 into ten segments, ten look-up operations can be performed simultaneously (e.g., one look-up operation per segment). This in turn allows the clock speed of computer-readable media 204 to be at 26 Mhz instead of 260 Mhz.

Alternatively, a different clock speed could be chosen. For example, pulse look-up-table 216 can be divided into five equal segments of forty-eight samples each but not divided into separate segments for I and Q values. This would use a clock speed of 52 Mhz but would allow for pulse look-up-table 216 to be half the size because the I and Q pulse samples are not duplicated.

Embodiments in which pulse look-up-table 216 is minimized as noted above use less area than a FIR filter approach. As stated above, 240 pulse samples are stored for each pulse. Since four pulses are stored a total of 960 pulse samples are stored. Each sample takes up a twelve bit word. The lookup table is thus 11,520 bits in size. This currently would use 0.005 sq mm in a sixty-five nanometer (nm) ROM. Because there are five additions (combining the pulses) and up to five negations per sample and five simultaneous reads (1 or each segment), a total area of 0.025 sq. mm on a sixty-five nm ROM is used. Duplication of pulse look-up-table 216 for I and Q further would use a total of 0.05 sq. mm on a sixty-five nm ROM. Thus, minimizing a pulse lookup-up-table enables, in some embodiments, use of less area of an electronic circuit.

Pulse look-up-table 216 may be divided into ten segments using various techniques. One such technique involves separating pulse look-up-table 216 into ten separate look-up-tables (one for each segment). Another technique involves using one look-up-table but having ten read word lines (one for each segment). The use of the singular term pulse look-up-table is not intended to preclude either of these techniques or any other variation on these techniques that allows the ten segments to be simultaneously accessed.

Returning again to FIG. 2, pulse generator 208 uses the angle value for each I and Q to look up pulse samples in pulse look-up-table 216. Pulse generator 208 inverts a pulse sample to negative if the negation value is one. If the zero value is one, pulse generator 208 uses zero for each of the pulse samples for the associated I or Q pulse and does not perform look-up operations for that pulse. Pulse generator 208 includes ten separate sub-generators, each of which generates an individual pulse at the same time as the other sub-generators (e.g., one for each of I and Q for each of the five overlapping IQ constellation symbols). Each of these sub-generators includes a counter for keeping track of which sample and which segment the sub-generator is currently generating for their respective pulse. Pulse generator 208 combines five I pulse samples for a given sample time together to create a complete I signal sample and combines five Q pulse samples for a given sample time together to create a complete Q signal sample.

Note that one or more of the entities shown in FIGS. 1 and/or 2 may be further divided, combined, and so on. Thus, these entities illustrate some of many possibilities (alone or combined) that are capable of employing the described techniques.

Example Method

Techniques for generating I and Q pulses from IQ constellation symbols using a pulse look-up-table are described in part with the method described below. Aspects of this method may be implemented in hardware, firmware, software, or a combination thereof. The method is shown as a set of acts that specify operations performed by one or more entities and are not necessarily limited to the order shown.

Figure 6:
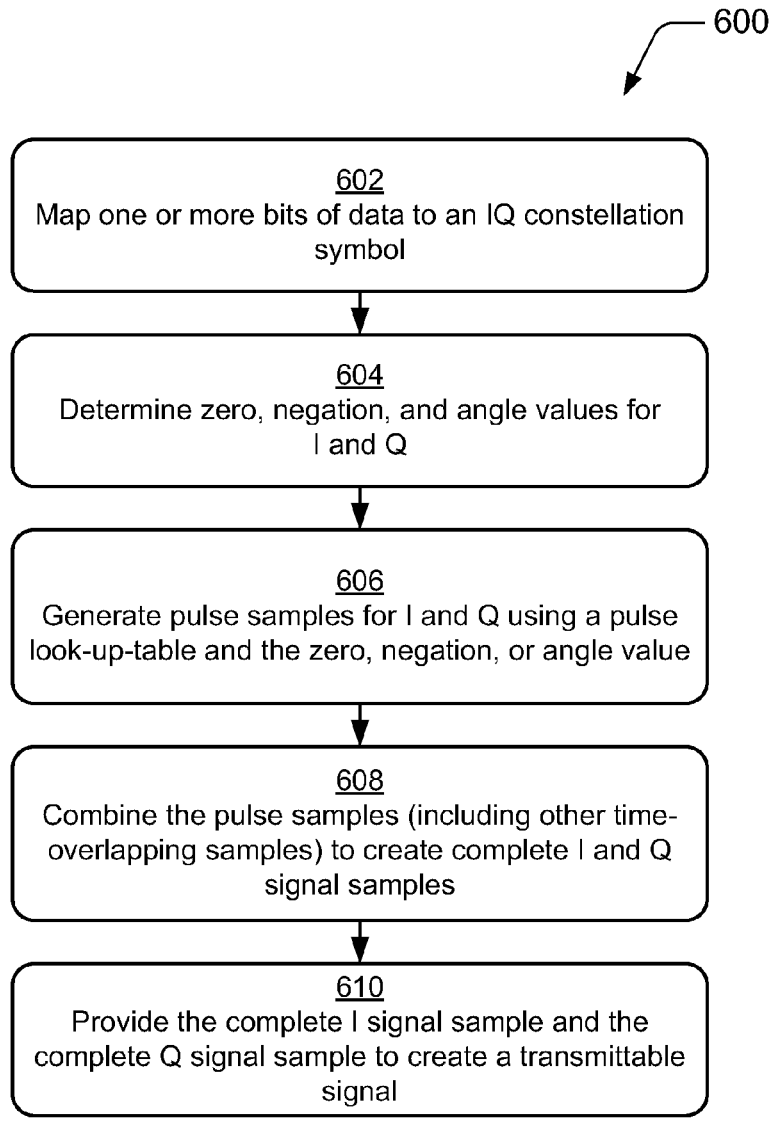
FIG. 6 illustrates a method for generating I and Q pulse samples from data.

FIG. 6 illustrates a method 600 for generating I and Q pulse samples, which samples may be combined into a transmittable signal. At 602, one or more bits of data are mapped to an In-phase Quadrature-phase (IQ) constellation symbol (sometimes referred to herein as an IQ symbol for brevity). In some modulations schemes, such as the one used by EDGE, a current rotation value is added to an initially mapped IQ constellation symbol value as part of the mapping. Using FIG. 2 as an example, data-to-IQ-symbol converter 206 maps one or more bits of data to an IQ constellation symbol. Current rotation 212 is used as part of this mapping process. Data-to-IQ-symbol converter 206 then increments current rotation 212 by three and subtracts sixteen if the result is greater than fifteen.

By way of example, assume that the current value in current rotation 212 is fifteen and the bits being modulated are "011." These bits are mapped to IQ constellation symbol 2 for no rotation (e.g., when current rotation 212 is zero). In this scenario, data-to-IQ-symbol converter 206 adds fifteen to two to get seventeen. Because seventeen is greater than fifteen converter 206 subtracts sixteen to get one. The bits "011" are then mapped to IQ constellation symbol 1. Data-to-IQ-symbol converter 206 then increments current rotation 212 by three to get eighteen. Because eighteen is greater than fifteen, converter 206 subtracts sixteen and sets current rotation 212 to two, which is the rotation value used for the next IQ constellation symbol's rotation.

At 604, a first zero value, a first negation value, and a first angle value are determined for an I value and a second zero value, a second negation value, and a second angle value are determined for a Q value. These I and Q values are associated with the IQ constellation symbol mapped at 602. Continuing the above example, pulse generator 208 determines the first zero value, the first negation value, and the first angle for the I value and the second zero value, the second negation value, and the second angle value for the Q value. This data can be hard coded ahead of time so that no processing is required. Example values are listed above in Table I. For a mapped IQ constellation symbol of 1, the first zero, negation, and angle values (determined for I) are 0, 0, and 1, respectively. The second zero, negation, and angle values (determined for Q) are 0, 0, and 3, respectively.

At 606, a first pulse sample for I and second pulse sample for Q are generated using a pulse look-up-table and at least one of the first zero, the first negation, the first angle, the second zero, the second negation, or the second angle values determined at 604. If the zero value is I for a given I or Q then the pulse sample is always zero and the pulse look-up-table is not used. The pulse look-up-table may, but is not required to be, minimized and divided into segments. For example, pulse generator 208 may generate the first pulse sample for I by using the first zero value or by looking up a pulse sample in pulse look-up-table 216 using the first angle value, a current sample count, and a current segment count as indices to find an appropriate first pulse sample. Pulse generator 208 then negates the first pulse sample if the first negation value is one. Pulse generator 208 generates the second pulse sample for Q by using the second zero value or by looking up a pulse sample in pulse look-up-table 216 using the second angle value, the current sample count, and the current segment count as indices to find an appropriate second pulse sample. Pulse generator 208 then negates the second pulse sample if the second negation value is one.

The current sample and segment counts are counters that track the current sample of a given IQ constellation symbol. For a given IQ constellation symbol, pulse generator 208 starts at sample zero of segment zero and works up to sample forty-seven of segment zero. Then it moves on to sample zero of segment one to sample forty-seven of segment one. This continues to sample forty-seven of segment four at which point sample forty-seven of segment four is repeated and pulse generator 208 reads the samples in reverse order down to sample zero of segment four. This continues to sample zero of segment zero at which point the pulse for the IQ symbol is complete. A new pulse for a new IQ constellation symbol takes its place in the next sample time. In this example an entire pulse consisting of 480 pulse samples is generated.

Continuing the example above of an IQ constellation symbol of I, if pulse generator 208 is on the $240^{th}$ sample for the current symbol, it will read from sample forty-seven of segment four. The sample for I is the peak of a Gaussian distribution with the cosine of 22.5 degrees as the amplitude being distributed. The sample for Q is the peak of a Gaussian distribution with the cosine of 67.5 degrees as the amplitude being distributed. At the next sample time pulse generator 208 will begin to navigate the segments in reverse order. Thus, sample forty-seven of segment four will be read again and then sample forty-six, forty-five, forty-four, etc.

At 608, the first pulse sample is combined with other time-overlapping I pulse samples and the second pulse sample is combined with other time-overlapping Q pulse samples to create a complete I signal sample and a complete Q signal sample. For example, pulse generator 208 combines the first pulse sample with four other I pulse samples that are associated with four other IQ constellation symbols that are overlapping in time. Pulse generator 208 combines the second pulse sample with four other Q pulse samples that are associated with the four other IQ constellation symbols. This combination is linear and thus a simple addition.

Continuing our example above of an IQ constellation symbol of 1, the example symbol was on the $240^{th}$ sample of its pulse, which means that there are two symbols in front of the example symbol and two symbols behind the example symbol in relation to time. For the first symbol, pulse generator 208 is incrementing pulse look-up-table 216 in reverse-order and is on sample zero of segment one. For the second symbol, pulse generator 208 is incrementing pulse look-up-table 216 in reverse-order and is on sample zero of segment three. For the third symbol, the example IQ symbol of 1, pulse generator 208 is incrementing pulse look-up-table 216 in order and is at sample forty-seven of segment four. For the fourth symbol, pulse generator 208 is incrementing pulse look-up-table 216 in order and is on sample forty-seven of segment two. For the fifth symbol, pulse generator 208 is incrementing pulse look-up-table 216 in order and is on sample forty-seven of segment zero. As noted, the segmentation of pulse look-up-table 216 allows each segment to be accessed by one look-up operation per sample time. The values of all five of the I pulse samples are linearly combined for the current sample time to provide a complete I signal sample. The values of all five of the Q pulse samples are linearly combined for the current sample time to provide a complete Q signal sample.

As a further example, consider the next sample time. For the first symbol, pulse generator 208 reverse-increments to sample forty-seven of segment zero. For the second symbol, pulse generator 208 reverse-increments to sample forty-seven of segment two. For the third symbol (the example symbol), pulse generator 208 starts incrementing in reverse-order at sample forty-seven of segment four (it repeats at the peak). For the fourth symbol, pulse generator 208 increments to sample zero of segment three. For the fifth symbol, pulse generator 208 increments to sample zero of segment one. Again, the values of all five of the I pulse samples are linearly combined for the current sample time to provide a complete I signal sample and the values of all five of the Q pulse samples are linearly combined for the current sample time to provide a complete Q signal sample.

At 610 the complete I signal sample and the complete Q signal sample are provided for combination as part of a transmittable signal. For example, data-to-I-and-Q converter 104 of FIG. 1 provides the complete I signal sample to IDAC converter 106 and the complete Q signal sample to QDAC converter 108. Note that for EDGE wireless communications, 606, 608, and 610 are repeated once per sample time while 602 and 604 are only repeated once every symbol period (96 sample times).

One or more of the techniques described above can be performed by one or more programmable processors executing a computer program to perform functions by operating on input data and generating output. Generally, the techniques can take the form of an entirely hardware embodiment, an entirely software embodiment, or an embodiment containing both hardware and software components. In one implementation, the method above is implemented in software, which includes but is not limited to firmware, resident software, microcode, etc. Furthermore, the method can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

Although the subject matter has been described in language specific to structural features and/or methodological techniques and/or acts, it is to be understood that the subject matter defined in the appended claims is not necessarily limited to the specific features, techniques, or acts described above, including orders in which they are performed.

What is claimed is:

1. A method comprising:
   generating an In-phase (I) pulse for an In-phase Quadrature-phase (IQ) constellation symbol using a pulse look-up-table, the I pulse comprising a first half of I pulse samples and a second half of the I pulse samples, the generating an I pulse comprising retrieving the first half of the I pulse samples from the pulse look-up-table in order and retrieving the second half of the I pulse samples by retrieving the first half of the I pulse samples from the pulse look-up-table in reverse-order, the retrieving occurring in less than one symbol period; and
   generating a Quadrature-phase (Q) pulse for the IQ constellation symbol using the pulse look-up-table, the Q pulse comprising a first half of Q pulse samples and a second half of the Q pulse samples, the generating a Q pulse comprising retrieving the first half of the Q pulse samples from the pulse look-up-table in order and retrieving the second half of the Q pulse samples by retrieving the first half of the Q pulse samples from the pulse look-up-table in reverse-order, the retrieving occurring in less than the same symbol period,
   wherein the I pulse and the Q pulse are combinable into a transmittable signal.

2. The method as recited in claim 1, further comprising combining the I pulse with a time-overlapping I pulse to create a complete I signal.

3. The method as recited in claim 1, further comprising combining the Q pulse with a time-overlapping Q pulse to create a complete Q signal.

4. The method as recited in claim 1, wherein generating an I pulse comprises:
   determining a zero value, a negation value, or an angle value for an I value of the IQ constellation symbol;
   generating an I pulse sample for the IQ symbol using the pulse look-up-table and the zero value, the negation value, or the angle value; and
   combining the I pulse sample with a time-overlapping I pulse sample.

5. The method as recited in claim 1, wherein generating a Q pulse comprises:
   determining a zero value, a negation value, or an angle value for a Q value of the IQ constellation symbol;
   generating a Q pulse sample for the IQ symbol using the pulse look-up-table and the zero value, the negation value, or the angle value; and
   combining the Q pulse sample with a time-overlapping Q pulse sample.

6. The method as recited in claim 1, wherein the IQ constellation symbol is part of a $3\pi/8$ rotated eight-Phase-Shift-Keying (8-PSK) constellation used in a modulation scheme for Enhanced Data rates for GSM Evolution (EDGE) wireless communications.

7. The method as recited in claim 1, wherein the pulse look-up-table is divided into simultaneously accessible segments, each of the segments being of one half of a symbol period.

8. The method as recited in claim 1, wherein:
   the I pulse comprises 480 I pulse samples; and
   the Q pulse comprises 480 Q pulse samples.

9. The method as recited in claim 1, further comprising:
   receiving data;
   determining the IQ constellation symbol for the data;
   communicating the I pulse to a first digital-to-analog converter; and
   communicating the Q pulse to a second digital-to-analog converter.

10. The method as recited in claim 1, wherein the pulse look-up-table stores about half of the modulation scheme's possible Q pulse samples and about half of the modulation scheme's possible I pulse samples.

11. The method as recited in claim 10, further comprising generating another of the Q pulse or the I pulse and wherein the generating the Q pulse is based on the stored half of the modulation scheme's possible Q pulse samples and the generating the I pulse is based on the stored half of the modulation scheme's possible I pulse samples.

12. A system comprising:
   a pulse look-up-table; and
   a pulse generator coupled to the pulse look-up-table, the pulse generator configured to:
      generate an In-phase (I) pulse for an In-phase Quadrature-phase (IQ) constellation symbol using the pulse look-up-table, the I pulse comprising a first half of I pulse samples and a second half of the I pulse samples, the generating an I pulse comprising retrieving the first half of the I pulse samples from the pulse look-up-table in order and retrieving the second half of the I pulse samples by retrieving the first half of the I pulse samples from the pulse look-up-table in reverse-order, the retrieving occurring in less than one symbol period; and generate a Quadrature-phase (Q) pulse for the IQ constellation symbol using the pulse look-up-table, the Q pulse comprising a first half of Q pulse samples and a second half of the Q pulse samples, the generating a Q pulse comprising retrieving the first half of the Q pulse samples from the pulse look-up-table in order and retrieving the second half of the Q pulse samples by retrieving the first half of the Q pulse samples from the pulse look-up-table in reverse-order, the retrieving occurring in less than the same symbol period, wherein the I pulse and the Q pulse are combinable into a transmittable signal.

13. The system as recited in claim 12, the system further configured to combine the I pulse with a time-overlapping I pulse to create a complete I signal.

14. The system as recited in claim 12, the system further configured to combine the Q pulse with a time-overlapping Q pulse to create a complete Q signal.

15. The system as recited in claim 12, wherein to generate an I pulse comprises:
determine a zero value, a negation value, or an angle value for an I value of the IQ constellation symbol;
generate an I pulse sample for the IQ symbol using the pulse look-up-table and the zero value, the negation value, or the angle value; and
combine the I pulse sample with a time-overlapping I pulse sample.

16. The system as recited in claim 12, wherein to generate a Q pulse comprises:
determine a zero value, a negation value, or an angle value for a Q value of the IQ constellation symbol;
generate a Q pulse sample for the IQ symbol using the pulse look-up-table and the zero value, the negation value, or the angle value; and
combine the Q pulse sample with a time-overlapping Q pulse sample.

17. The system as recited in claim 12, wherein the IQ constellation symbol is part of a $3\pi/8$ rotated eight-Phase-Shift-Keying (8-PSK) constellation used in a modulation scheme for Enhanced Data rates for GSM Evolution (EDGE) wireless communications.

18. The system as recited in claim 12, wherein the pulse look-up-table is divided into simultaneously accessible segments, each of the segments being of one half of a symbol period.

19. The system as recited in claim 12, the system further configured to:
receive data;
determine the IQ constellation symbol for the data;
communicate the I pulse to a first digital-to-analog converter; and
communicate the Q pulse to a second digital-to-analog converter.

20. The system as recited in claim 12, wherein the pulse look-up-table is minimized to include a unique set of pulses, the unique set including the stored half of the modulation scheme's possible Q or I pulses, the unique set of pulses being a subset of all possible pulses for the modulation scheme and capable of replicating all possible pulses through negation or mapping between In-phase (I) and Quadrature-phase (Q).

21. The system as recited in claim 12, further comprising:
a processor, wherein the pulse generator includes computer-executable instructions configured to be executed by the processor.

22. The system as recited in claim 12, wherein the pulse generator comprises logic implemented in hardware.

* * * * *